United States Patent
Lubowich et al.

(10) Patent No.: US 8,798,255 B2
(45) Date of Patent: Aug. 5, 2014

(54) METHODS AND APPARATUS FOR DEEP INTERACTION ANALYSIS

(75) Inventors: Yuval Lubowich, Raanana (IL); Oren Pereg, Amikam (IL); Ezra Daya, Petah-Tiqwa (IL)

(73) Assignee: Nice Systems Ltd, Raanana (IL)

( * ) Notice: Subject to any disclaimer, the term of this patent is extended or adjusted under 35 U.S.C. 154(b) by 1357 days.

(21) Appl. No.: 12/414,682

(22) Filed: Mar. 31, 2009

(65) Prior Publication Data
US 2010/0246799 A1    Sep. 30, 2010

(51) Int. Cl.
| | | |
|---|---|---|
| *G06F 17/27* | (2006.01) | |
| *H04M 3/00* | (2006.01) | |
| *H04M 5/00* | (2006.01) | |
| *G10L 15/14* | (2006.01) | |
| *G10L 15/183* | (2013.01) | |
| *G10L 15/22* | (2006.01) | |
| *H04M 3/51* | (2006.01) | |

(52) U.S. Cl.
CPC ............ *G10L 15/22* (2013.01); *G10L 15/142* (2013.01); *H04M 2201/36* (2013.01); *G10L 15/183* (2013.01); *H04M 3/5175* (2013.01); *H04M 2201/12* (2013.01)
USPC .......................................... 379/265.09; 704/9

(58) Field of Classification Search
USPC .............. 379/265.09; 704/235, 245, 246, 252
See application file for complete search history.

(56) References Cited

U.S. PATENT DOCUMENTS

| 7,930,179 | B1 * | 4/2011 | Gorin et al. ................... 704/246 |
| 2004/0260550 | A1 * | 12/2004 | Burges et al. ................. 704/259 |
| 2009/0097634 | A1 * | 4/2009 | Nambiar et al. .......... 379/265.09 |
| 2009/0112588 | A1 * | 4/2009 | Kummamuru et al. ....... 704/245 |
| 2010/0104086 | A1 * | 4/2010 | Park ......................... 379/265.09 |

* cited by examiner

*Primary Examiner* — Nafiz E Hoque
(74) *Attorney, Agent, or Firm* — Soroker-Agmon (57) ABSTRACT

A method and apparatus for automatically sectioning an interaction into sections, in order to get more insight into interactions. The method and apparatus include training, in which a model is generated upon training interactions and available tagging information, and run-time in which the model is used towards sectioning further interactions. The method and apparatus operate on context units within the interaction, wherein each context unit is characterized by a feature vector relate to textual, acoustic or other characteristics of the context unit.

20 Claims, 5 Drawing Sheets

METHODS AND APPARATUS FOR DEEP INTERACTION ANALYSIS

TECHNICAL FIELD

The present disclosure relates to speech recognition in general, and to a method and apparatus for conversational interaction sectioning.

BACKGROUND

Large organizations, such as commercial organizations, financial organizations or public safety organizations conduct numerous interactions with customers, users, suppliers or other persons on a daily basis. Many of these interactions are vocal, or at least comprise a vocal component, such as an audio part of a video or face-to-face interaction. In order to get insight into the data conveyed by these interactions, the interactions are captured and often recorded. In some cases, quality monitoring is performed for assessing the quality of the agent handling the interaction or another entity associated with the call center like a product, the organization, or the like. Quality monitoring is performed either manually by listening to interactions, or by automated systems.

Automated systems activate multiple tools as part of the analysis. Such tools may include voice recognition tools such as automatic speech recognition or word spotting, emotion analysis tools, call flow analysis, including for example interaction duration, hold time, number of transfers or the like.

However, even if full and accurate transcription and additional data related to an interaction is available, this still leaves many questions unanswered, such as what makes interactions handled by a particular agent more effective than those handled by others, why is the average duration of interactions handled by one agent longer than average, or others.

There is thus a need in the art for a method and system for deep interaction analysis, in order to uncover further insights from the interactions, beyond the data available from voice analysis tools. Such analysis will provide better understanding and enable improvements in interaction handling in call centers or other interaction-rich environments.

SUMMARY

A method and apparatus for sectioning an interaction captured in a call center into sections representing the flow of the interaction, the interaction flow can be further analyzed, and analyses can be performed on specific sections of the interactions.

A first aspect of the disclosure relates to a method for automatically sectioning an audio signal of an interaction held in a call center, into sections representing the flow of the interaction, the method comprising the steps of: receiving the audio signal from a logging and capturing unit associated with the call center; performing audio analysis on the audio signal for obtaining run-time data; segmenting the audio signal into one or more context units; extracting a feature vector comprising one or more run-time features of the context unit, using the run-time data; classifying the context unit using a sectioning model and the feature vector, to obtain one or more section labels to be associated with the context unit; and grouping temporally close context units assigned identical labels into one section. Within the method, the audio analysis step optionally comprises a voice recognition step for obtaining text from the run-time interaction, and further comprising a natural language processing step applied to the text. Within the method, the voice recognition step optionally comprises activating one or more engines selected from the group consisting of: a speech to text engine; a word spotting engine; an emotion detection engine; and a talkover engine. The method can further comprise an optimization step for enhancing classifying the context units. Within the method, the optimization step is optionally rule-based or uses a Markovian model for determining optimal transition between section candidates for the context units. Within the method, the optimization step optionally uses hint words for optimizing the classification of a context unit to a specific section type. Within the method, the feature is optionally selected from the group consisting of: indication to a market vertical uniqueness of one or more words or word combinations related to words in the context unit; repetitions of one or more words or word combinations related to words in the context unit; indication to a market vertical uniqueness of one or more words or word combinations related to words in a second context unit preceding the context unit; repetitions of one or more words or word combinations related to words in a second context unit preceding the context unit; index position of the context unit within the interaction; absolute position of the context unit within the interaction; relative position of the context unit within the interaction; interaction duration; duration of the context unit; speaker speaking within the context unit; average duration of silence between words within the context unit; and part of speech of one or more words within the context unit. The method can further comprise a sectioning training step for generating the sectioning model. The sectioning training step optionally comprises: receiving a training interaction; performing training audio analysis on the training interaction for obtaining training data; segmenting the training interaction into one or more training context units; extracting a training feature vector comprising one or more training features of the one or more training context unit, using the training data; receiving sectioning information related to the training interaction, the sectioning information comprising a section indication for the training context units or a part thereof; and generating a model using the feature vectors and their corresponding section indication or label. Within the method, the training audio analysis step optionally comprises a voice recognition step for obtaining training text from the training interaction, and further optionally comprising a natural language processing step applied to the training text. Within the method, the training feature is optionally selected from the group consisting of: indication to a market vertical uniqueness of one or more words or word combinations related to words in the context unit; repetitions of one or more words or word combinations related to words in the context unit; indication to a market vertical uniqueness of one or more words or word combinations related to words in a second context unit preceding the context unit; repetitions of one or more words or word combinations related to words in a second context unit preceding the context unit; index position of the context unit within the interaction; absolute position of the context unit within the interaction; relative position of the context unit within the interaction; interaction duration; duration of the context unit; speaker speaking within the context unit; average duration of silence between words within the context unit; and part of speech of one or more words within the context unit. The method can further comprise a step of presenting sectioning statistics. The method can further comprise a step of comparing sectioning statistics between two or more categories or between two or more agents, or a step of using the section label as categorization criteria. The method can further comprise a step of further analysis, selected from the group consisting of: topic extraction from one or more sections, link analysis of one or more sections, and root cause analysis of one or more sections.

Another aspect of the disclosure relates to an apparatus for automatically sectioning an interaction held in a call center, based on one or more training interactions, the apparatus comprising: an interaction receiving component arranged to receive one or more first audio signals representing the interaction or one or more second audio signals representing the training interaction; an extraction component arranged to extract data from the first audio signal or the second audio signal; a context unit segmentation component arranged to segment the first audio signal or the second audio signal into context units; a feature vector determination component arranged to generate a feature vector comprising one or more features based on the data extracted from the first audio signal or the second audio signal; and a sectioning component arranged to apply a sectioning model on the feature vector. The apparatus can further comprise a natural language processing component arranged to perform linguistic analysis on text extracted by the extraction component. Within the apparatus, the extraction component comprises one or more engines from the group consisting of: a speech to text engine, a word spotting engine; an emotion detection engine; and a talkover engine. The apparatus can further comprise a sectioning training component arranged to train the sectioning model. Within the apparatus, each feature is optionally selected from the group consisting of: indication to a market vertical uniqueness of one or more words or word combinations related to words in the context unit; repetitions of one or more words or word combinations related to words in the context unit; indication to a market vertical uniqueness of one or more words or word combinations related to words in a second context unit preceding the context unit; repetitions of one or more words or word combinations related to words in a second context unit preceding the context unit; index position of the context unit within the interaction; absolute position of the context unit within the interaction; relative position of the context unit within the interaction; interaction duration; duration of the context unit; speaker speaking within the context unit; average duration of silence between words within the context unit; and part of speech of a word within the context unit.

Yet another aspect of the disclosure relates to a computer readable storage medium containing a set of instructions for a general purpose computer, the set of instructions comprising: receiving an audio signal representing an interaction captured within a call center; performing audio analysis on the audio signal for obtaining tested data; segmenting the audio signal into context unit; extracting a tested feature vector comprising one or more features of the context unit, using the data; classifying the context unit using a sectioning model and the tested feature vector, to obtain one or more section labels to be associated with the context unit; and grouping context units assigned identical labels into one section.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

An important factor in interaction analysis includes the call duration, also known as the handle time. Analyzing the interaction duration can help a call center in spotting knowledge gaps of agents or other personnel handling the interactions, detecting problems in operational processes, managing resources and improving the operational efficiency. However, the factor of handling time does not provide the full picture. Understanding why certain interactions are longer or shorter than the average and what are the implications of the short or long duration will enable the call center to draw conclusions, either in regard to a particular agent or to the whole organization, and thus increase performance and efficiency A lot of information can be yielded by sectioning interactions into segments and performing finer analysis on the absolute or relative duration of each segment, rather than considering the interaction as one unit. The segments may include, for example, one or more of the following: introduction, initial identification, small talk, hold time, the customer presenting the issue, further identification, handling the issue, upsale (i.e., selling to a customer a more advanced product or service than he or she already have or intended to purchase), ending, or other segments, which may be general or specific to the organization.

Figure 1A:
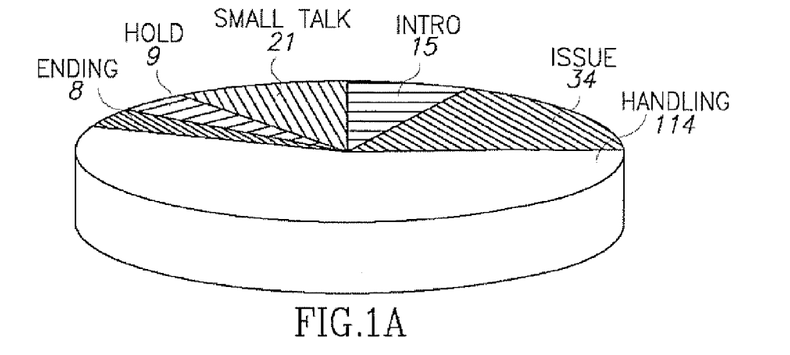
FIGS. 1A, 1B and 1C show graphic illustrations demonstrating various use cases of the disclosed method and apparatus.
Figure 1B:
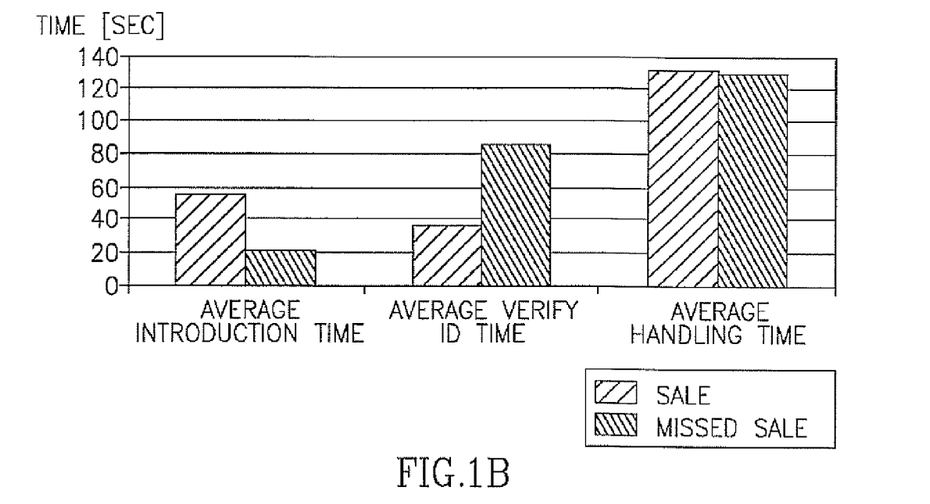
Figure 1C:
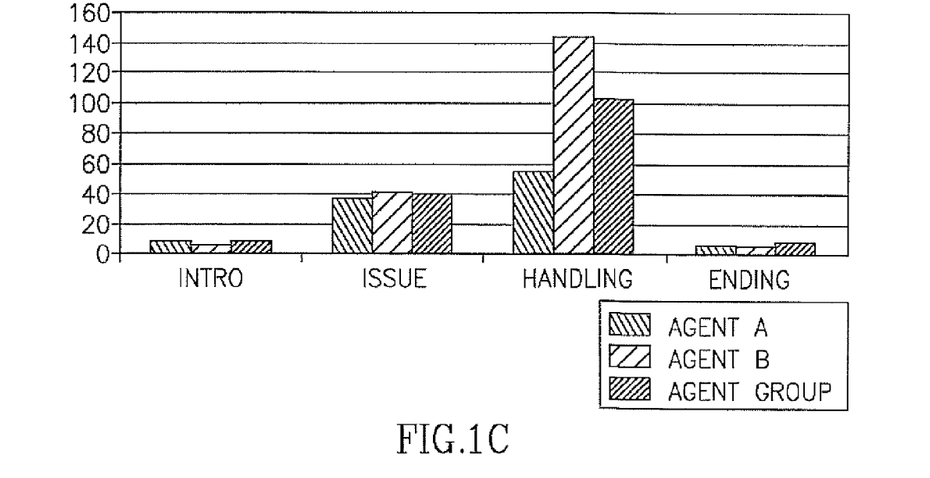

Referring now to FIGS. 1A, 1B and 1C, showing exemplary situations in which analyzing the sectioning of interactions provides benefit.

FIG. 1A shows a pie chart demonstrating the average relative part of each segment in interactions, as well as the average time in seconds. Such pie chart enables a call center to understand how interaction is handled in average, and draw conclusions.

Call center management can deduce, for example, that in accordance with its business type, the small talk section or the introduction section are too long, and instruct the agents accordingly. In another example, the call center can decide to hold only a shorter basic identification, and only if required, deeper identification will take place.

Referring now to FIG. 1B, showing comparison between the average segment time in interactions that ended with a sale, vs. interactions in which a sale was missed. It is seen that although in both interaction types the average handling time was almost equal, in successful interactions the introduction time was longer than in unsuccessful interactions, while the ID verification time was shorter.

In such case, a call center marketing manager or another person can reach a conclusion that a relatively long introduction time, such as sixty seconds, can increase the probability of a successful sale, whereas short introduction time, such as 20 seconds, significantly reduces the sale probability. When instructing sales agents, referring to the proper duration and manner of conducting an introduction section may improve the agents' results. Interaction sectioning information shed light on this observation, and enabled the conclusion.

Referring now to FIG. 1C, showing a comparison of sections' time between Agent A, Agent B and an agent group. While in the "technical" categories of introduction, issue, and ending the time is almost equal, agent A spends less time on the handling section than the average, while agent B spends more time than the average. A call center management can thus decide to pay extra compensation to agent A, and/or provide agent B with training, or the like. However, in preferred embodiments, the success ratio between the agents should be considered as well. If the success rate of agent B is higher than of agent A's or the agent group, then the longer handling time is beneficial and it is agent A, who should receive further training. The topic of the interaction, for example the relevant product or service should be considered as well, for example by utilizing categorization tools which categorize interactions based on their contents, meta data or both.

Further, relevant information can be yielded by performing advanced analysis on only certain segments of the interaction. For example, transcribing and then performing text analysis on the section of the interaction in which the main issue is discussed, can provide more focused information while requiring less resources than required for analyzing the whole interaction.

Figure 2:
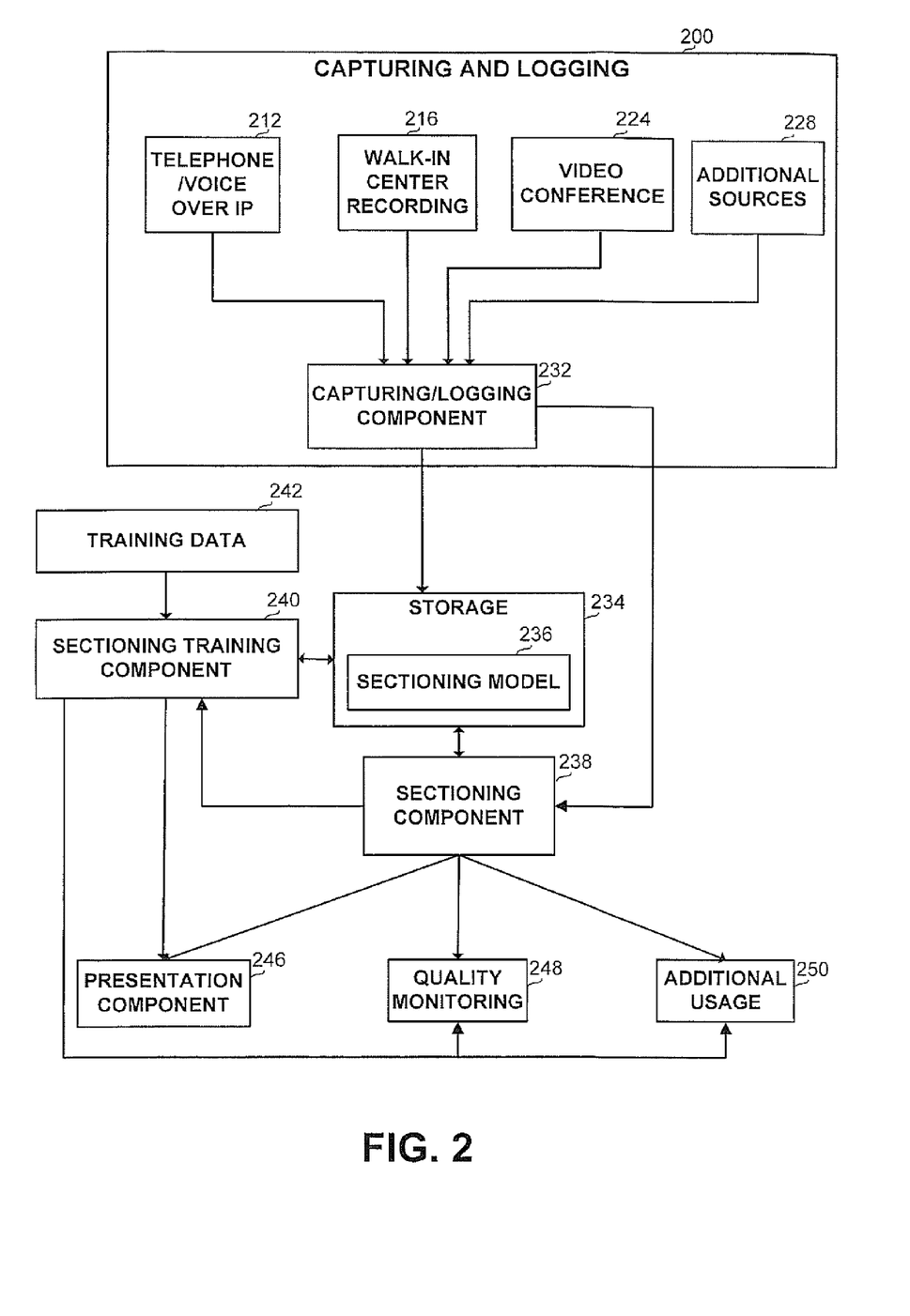
FIG. 2 is a block diagram of the main components in a typical environment in which the disclosed method and apparatus are used.

Referring now to FIG. 2, showing block diagram of the main components in a typical environment in which the disclosed methods and apparatus are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, various encoding and decoding protocols such as G729, G726, G723.1, and the like. The interactions are captured using capturing or logging components 200. The vocal interactions usually include telephone or voice over IP sessions 212. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two- or more sided conversation. The interactions can further include face-to-face interactions, such as those recorded in a walk-in-center 216, video conferences 224, and additional sources of data 228. Additional sources 228 may include vocal sources such as microphone, intercom, vocal input by external systems, broadcasts, files, or any other source. Additional sources may also include non vocal sources such as e-mails, chat sessions, screen events sessions, facsimiles which may be processed by Object Character Recognition (OCR) systems, or others.

Data from all the above-mentioned sources and others is captured and preferably logged by capturing/logging component 232. Capturing/logging component 232 comprises a computing platform executing one or more computer applications as detailed below. The captured data is optionally stored in storage 234 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage 234 is storage 236 which stores a sectioning model which is determined via training as detailed below, and used in run-time for sectioning further interactions. Storage 234 can comprise a single storage device or a combination of multiple devices. Sectioning component 238 sections the interactions, i.e. indicates for each word or each time range within an interaction to which segment it belongs, such as introduction, small talk, issue presentation, handling, or the like. The apparatus further comprises sectioning training component 240 for training a model upon training data 242. Sectioning component 238 and sectioning training component 240 are further detailed in association with FIG. 5 below.

The output of sectioning component 238 and optionally additional data are preferably sent to presentation component 246 for presentation in any way the user prefers, including for example various graphic representations, textual presentation, table presentation, vocal representation, or the like, and can be transferred in any required method, including showing on a display device, sending a report, or others. The results can further be transferred to or analyzed by a quality monitoring component 248, for monitoring the performance of an agent, an agent group, interactions belonging to a particular category, or the like. The results are optionally transferred also to additional usage components 250, if required. Such components may include categorization components that can use the sectioning data as categorization criteria. For instance, the categorization criteria can filter interactions with "identity verification" section that is longer than 90 seconds, filter interactions that contain at least two "issue" sections, or the like. Additional usage components may also include further analysis, for example performing root cause analysis only on specific section type, e.g., "issue" or "handling". Additional usage components may also include playback components, report generation components, alert generation components, or others. The sectioning results can be further fed back and change the sectioning model generated by sectioning training component 240.

The apparatus preferably comprises one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 3:
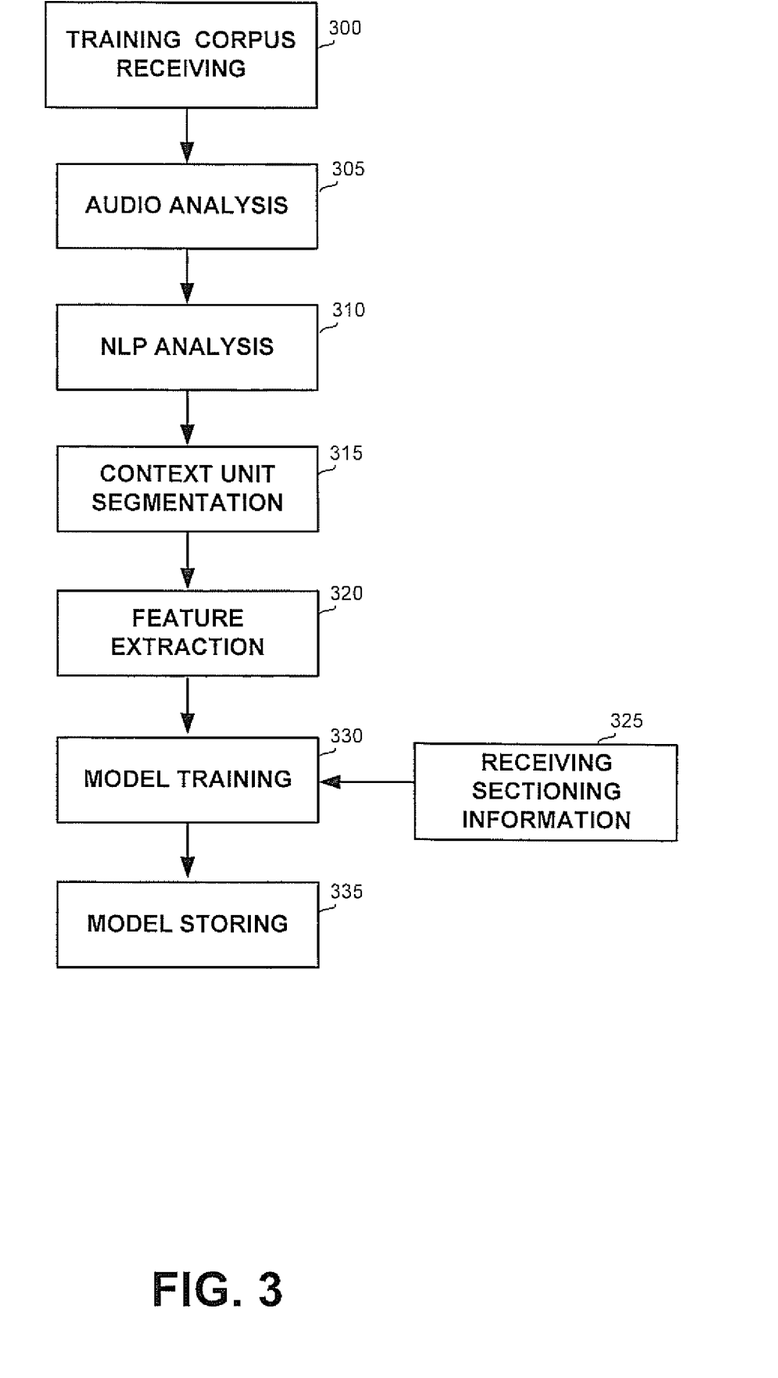
FIG. 3 is a flowchart of the main steps in a method for generating models for interaction sectioning, in accordance with the disclosure.
Figure 4:
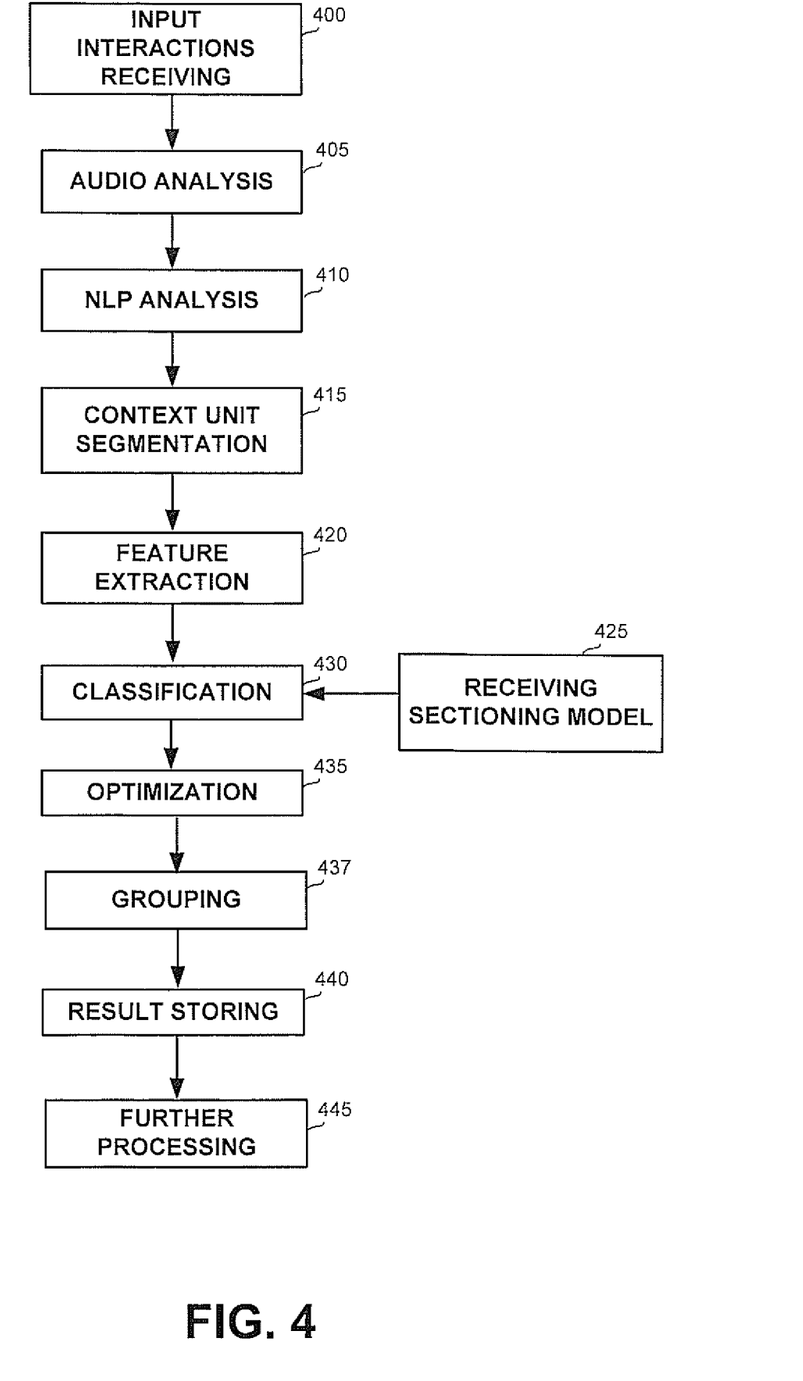
FIG. 4 is a flowchart of the main steps in a method for interaction sectioning, in accordance with the disclosure.

Referring now to FIG. 3 and FIG. 4, showing flowcharts of methods for sectioning training and for sectioning classification. In some embodiments, the sectioning is performed per context unit, i.e., per a complete unit of speech which is usually bounded by silence, which constitutes the basic unit for classification. Each input interaction is divided into context units, and each context unit is labeled prior to the training to be of a particular section type (e.g. introduction, issue presentation, handling, ending, etc.). In testing or run-time, the section type is determined for each context unit of the interaction. The training and classification processes of the section type of each context unit are feature based, i.e., based on features characterizing the context unit. Thus, each context unit is represented by a feature vector comprising features related to the context unit. In a preliminary stage to the training process the training corpus is manually tagged, i.e. each context unit is labeled/associated with a section type indication. In the training process a model is generated by associating each feature vector or a sequence of feature vectors with a tag, i.e. a section type, belonging to a pre-defined list of section types. Then in run-time, the feature vectors are extracted from the context unit, and by applying the generated model to the feature vector, the section of each context unit is determined.

It will be appreciated that whenever the description below relates to processing an interaction, it is to be understood to relate to an audio signal that captured the whole or part of an interaction, including phone calls, video conferences, or the like.

Referring now to FIG. 3, showing a flowchart of the main steps in a method for interaction sectioning training. The method is used for constructing models for interaction sectioning, in accordance with the disclosure. The method of FIG. 3 or similar methods intended for the same result is optionally performed on one corpus and used within multiple call centers. If enhanced performance is required, or specific needs or a particular call center are to be met, a more specific model can be trained for a specific call center in the same manner.

The method starts with training corpus receiving step 300, in which captured or logged interactions are received for processing. The interactions should characterize as closely as possible the interactions regularly captured at the environment. When one model is to be used in multiple call centers, it is preferred that the model is trained using interactions captured in multiple call centers, so that the model is not biased and represents all target call center environments.

On audio analysis step 305, engines are activated on one or more of the interactions. The activated engines preferably include speech recognition engines, such as speech-to-text or word spotting engines, or any other engine such as emotion detection engine, a call flow analysis engine, a talk analysis engine, or other tools for retrieval or extract of data from interactions.

On Natural Language Processing (NLP) Analysis step 310, linguistic pre-processing is performed on text retrieved on step 305, including for example Part of Speech (POS) tagging and stemming, i.e. finding the base form of a word. The analysis can be performed using any proprietary, commercial, or third party tool, such as LinguistxPlatform™ manufactured by Inxight (www.inxight.com).

On context unit segmentation step 315, the raw text resulting from audio analysis step 305 followed by NLP analysis step 310 is segmented into context units. A context unit is generally a sequence of words bounded by silence which is generally longer than the silence between two consecutive words. The breaks between words can be received from the speech recognition engine activated on step 305, or obtained by an algorithm that measures the time difference between words. A predetermined limit of number of words belonging to one context unit can be applied, in order not to create too long context units if no long-enough time difference is detected between words. Another option for context unit segmentation can be arbitrary segmentation, for example by segmenting the interaction to non-overlapping sequences of X words each.

On feature extraction step 320, a feature vector is extracted for each context unit, and is later utilized with manual sectioning information in training the sectioning model.

The features can include any linguistic, acoustic or metadata feature associated with the context unit as a whole, with words of the context unit or with the whole interaction. In some embodiments, the features can include one or more of the following features: Context unit words: the words in the training data are enumerated, and each utterance can be characterized as a sequence of indices indicating the words of the utterance. This feature optionally relates to the base form of a word, i.e. the stem of the word. "Stop words" such as determiners and prepositions are optionally excluded. The feature may also relate to the sum of repetitions of all words in the context unit, the average or another parameter thereof.

Market vertical uniqueness of words in the context unit, i.e. to what degree the words in the context unit are unique to the market vertical, i.e. domain, such as food, communication, or others. The market vertical uniqueness of a word is optionally determined based on the relative frequency of the word in the training transcripts, relatively to the frequency in a general corpus. A word is regarded as market vertical unique if the market vertical uniqueness of the word is greater than the average market vertical uniqueness of all the words in the training data.

The previous context unit: the values of the features discussed above relating to the previous context unit, i.e., the word uniqueness, number of repetitions, words, or other parameters related to one or more previous context unit.

The next context unit: the values of the features discussed above relating to the next context unit, i.e., the word uniqueness, number of repetitions, words, or other parameters related to one or more next context unit.

Position features. These features are optionally applied to only the first and last predetermined number of context units, such as the first five (5) context units and the last five (5) context units within an interaction, as they are often uninformative to the rest of the interaction. These features may include any one or more of the following:

Context unit index position, i.e., the ordinal number (index) of an context unit within the interaction.

Context unit absolute position, i.e., the position of a context unit in terms of absolute time within an interaction. This feature is optionally provided within predetermined time windows, such as 15 mSec, and for only a predetermined number of first and last context units of the interaction.

Context unit relative position, i.e., the position of a context unit in terms of percentage within the interaction. This feature is optionally provided in predetermined percentage, such as 5%, and for only a predetermined number of first and last context units of the interaction.

Call duration, measured in absolute time or in words.

Context unit duration, measured in absolute time or in words.

Speaker side of the context unit, for example 1 for the agent, 2 for the customer.

Silence average, i.e., the average duration of silence between words in the context unit.

Part of speech of the context unit words.

On step 325, sectioning data is received for interactions included in the training corpus. The data includes the tagging of an interaction which is the list of sections along with their start and end positions, and corresponding label for each section. Tagging can be provided for any subset of the sections of an interaction, or for all of them. For example, for a particular interaction, the sectioning manual tagging can be provided as follows: introduction: seconds 0-10; identification: seconds 11-25; issue presentation: seconds 26-60; handling: seconds 61-200; and ending: seconds 200-210.

The sectioning data can be generated manually by a person listening to the interactions and detecting and tagging section boundaries and section types for each interaction by using an appropriate user-interface. Alternatively, after a sectioning system has been operative for a period of time, initial sectioning can be provided by the system and corrected by a human, in order to enhance future performance of the system. Alternatively, sectioning information can be generated in any other manner. Thus, as indicated in association with FIG. 4 below, the sectioning results can be fed back and be used to enhance the sectioning models.

On step 330, a model is trained using pairs, wherein each pair relates to one context unit and consists of a feature vector related to the context unit, and the section type assigned to the context unit in accordance with the sectioning information. Training is preferably performed using methods such as Neural networks, Support Vector Machines (SVM) as described for example in "An introduction to Support Vector Machines and other kernel-based learning methods" by Nello Cristianini and John Shawe-Taylor, Cambridge University Press, 2000, ISBN 0-521-78019-5, incorporated herein by reference, or other methods. The output of training step 330 is a sectioning model that will be used in production stage, also referred to as run-time or test stage, as discussed in association with FIG. 4 below. The sectioning model predicts the section type for each given feature vector. It will thus be appreciated that the larger and more representative the training corpus, the more predictive is the trained model.

On step 335 the model is stored in any permanent storage, such as storage device 234 of FIG. 2.

Referring now to FIG. 4, showing a flowchart of the main steps in a method for interaction sectioning classification.

Interaction receiving step 400, audio analysis step 405, NLP analysis step 410, context unit segmentation step 415 and feature extraction step 420 are analogous to training corpus receiving step 300, audio analysis step 305, NLP analysis step 310, context unit segmentation step 315 and feature extraction step 320 of FIG. 3 above. However, these steps are performed on run-time (also referred to as production or testing phase), for which no sectioning information is available.

On step 425 the sectioning model as generated on step 330 of FIG. 3 is provided. On step 430, sectioning classification takes place by using the feature vectors extracted on step 420 and the sectioning model trained on step 330 thus determining a section type indication for each context unit. Optionally, a confidence score is assigned to each section determination, indicating the certainty that a particular context unit belongs to the determined section type.

In order to keep the training models updated with current interactions, optionally a small portion of the captured interactions received on step 400, along with tagging information are used for off-line training of the sectioning model whereas the rest of the captured interactions, referred to as run-time interactions, are being classified on step 430.

On optional optimization step 435, further enhancement of the results is performed. In some embodiments the confidence score assigned to each context unit is considered, and the sectioning of the context units having relatively low scores may be reconsidered. In some embodiments, additional knowledge or rules are used. The sequential nature of an interaction can be used during optimization. For example, it can be indicated that a context unit labeled as ending can not come before a context unit labeled otherwise, or that an introduction section can not occur later than a predetermined number of seconds from the beginning of the interaction, or the like. In yet other examples, the likelihood of a context unit to be of a particular section type relates to the section of its immediate neighboring context units, for example the likelihood of an "issue" section following an "introduction" section is higher than the likelihood of an "issue" section following a "handling" section. A Markovian model that determines the optimal transition between section candidates for each context unit is optionally used for such optimization.

In some embodiments, the results of classification step 430, optimization step 435 and grouping step 437 can be fed back and be used to enhance the sectioning model received on step 425.

On grouping step 437, adjacent or relatively temporally close context units that share the same section type are optionally grouped together into one section. The output of this stage (which is the final output of the algorithm) is the entire interaction flow i.e. the different sections throughout the interaction and their position. In some embodiments, external data, such as hint words can be used for optimizing and enhancing the results.

The output of grouping step 437 is a sectioning of the interaction into segments, wherein each segment is associated with a label, for example, seconds 0-20: introduction, seconds 21-57: issue presentation; seconds 58-150: handling; seconds 150-170: wrap up.

On step 440 the sectioning results are stored, for example in storage device 234 of FIG. 2. The results may also be transferred to further processing step 445, which may include further processing such as performing statistics, presenting the results, comparing different agents or different categories, or the like, as described in association with FIG. 1 above. The processing can also include analysis such as topic extraction, root cause analysis or link analysis of one or more sections, such as "issue" sections, or the like. Topic extraction relates to automatically or manually compiling a list of key-phrases that represent, are extracted from, or are otherwise associated with a category or to major topics of a category, the environment, an associated person, or a particular subject or entity within the organization. Each key-phrase comprises one or more words or terms. Then relations between these key-phrases, such as "appearing together", "appearing after one another" or the like, can enhance the understanding of a category. Root cause analysis relates to analysis aimed at revealing the reason or the cause for a problem or an event exhibited in one or more interactions. Link analysis is a process that finds related concepts by extracting phrases that have a high co-appearance frequency within one or more analyzed phrases, paragraphs or other parts of an interaction.

It will be appreciated that it is possible to further analyze only certain sections of the interactions. For example, when testing compliance of the agent, the introduction and ending are important, but when analyzing the topic of an interaction these sections are usually not important, and it may be worthwhile to save resources and not analyze them.

It will be appreciated by a person skilled in the art that the training method of FIG. 3 above can be integrated as a single model training step within the sectioning method of FIG. 4.

Figure 5:
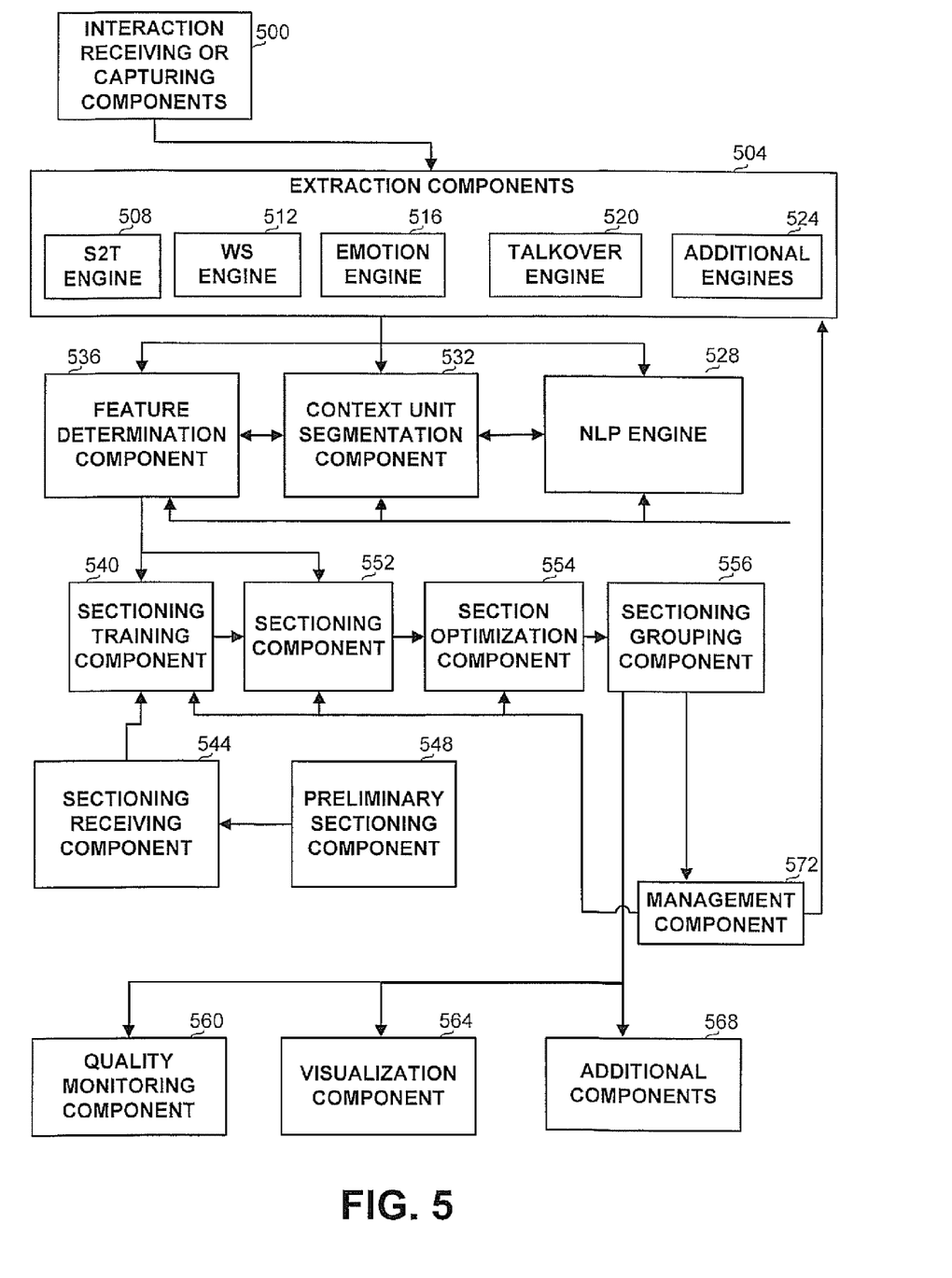
FIG. 5 is a block diagram of the main components in an apparatus for interaction sectioning, in accordance with the disclosure.

Referring now to FIG. 5, showing a block diagram of the main components in an apparatus for interaction sectioning, in accordance with the disclosure.

The apparatus implements sectioning component 238 and sectioning training component 240 of FIG. 2, which have multiple common components. The components of the apparatus are thus preferably software units such as modules, executables, libraries or the like.

The apparatus comprises interaction receiving or capturing components 500, arranged to capture or receive interactions from a storage device or from another source. The interactions are training interactions during training of the apparatus, for which tagging information is available, and run-time interactions which are to be sectioned in run-time.

The apparatus further comprises extraction components 504, arranged to extract data and metadata from the interactions, and in particular from their audio part. Extraction components 504 optionally comprise speech to text engine 508 arranged to transcribe an audio file and output as accurate as possible transcription of the audio signal; word spotting (WS) engine 512 designed to spot words out of a pre-compiled list in an audio signal; emotion detection engine 516 arranged to identify areas within an audio signal containing positive or negative emotions; talkover engine 520 arranged to identify silence areas, talkover areas, areas in which the agent or the customer speaks, areas in which the agent or the customer barge into the other person's speech, or the like; and additional engines 524 designed to extract additional information related to the interaction, such as number and timing of hold, transfer, or any other information.

The apparatus further comprises NLP engine 528 for performing NLP analysis on text extracted from the interactions, for example by S2Tengine 508 or WS engine 512. The NLP optionally comprises POS tagging, stemming of words, stop words removal, or other processing.

Yet other components are context unit segmentation component 532 and feature vector determination component 536. Context unit segmentation component 532 is designed to identify context units within an interaction, generally referred to as sentences, based on the silence between context units which is generally assumed to be longer than the silence between words in within the same context unit.

Feature determination component 536 is designed to generate a feature vector for each context unit, including features such as those detailed on association with feature extraction step 320 of FIG. 3 above. Feature vector determination component 536 receives and uses in generating the feature vector the output of extraction components 504 or of NLP engine 528 so it performs over the processed text.

The apparatus further comprises sectioning classification component 552 which performs the actual assignment of sections to the feature vectors representing the context units, as detailed in association with sectioning step 430 of FIG. 4; optionally sectioning optimization component 554 which performs optimization on top of the sectioning output of sectioning classification component 552 as detailed in association with step 435 of FIG. 4; and section grouping component 556 which groups adjacent or temporally close segments into the same section, as detailed in association with section grouping step 437 of FIG. 4.

Optional sectioning training component 540 is arranged to receive pairs of feature vectors and sectioning indications (or labels), and generates a sectioning model used by sectioning component 552.

The apparatus optionally comprises sectioning data receiving component 544 arranged to receive sectioning or tagging information from a dedicated component such as preliminary sectioning component 548, or from any other source. The sectioning information is transferred to sectioning training component 540.

The apparatus optionally comprises preliminary sectioning component 548, which is a tool for generating the training sectioning information. In some embodiments, preliminary sectioning component 548 comprises a user interface which enables a user to listen to interactions, and mark parts thereof as being of a section belonging to a precompiled list. Preliminary sectioning component 548 can also provide the option to introduce the section types list relevant to the organization, which may include common sections such as greeting and ending, as well as organization-specific sections.

Sectioning training component 540, sectioning data receiving component 544 and preliminary sectioning component 548 are optional, as the sectioning model can be received from an external source. For example, in a call center having multiple branches, it is possible to train the sectioning model once, and distribute the model to all branches. Alternatively, a sectioning model is trained in the lab based on a representative sample of interactions from multiple call centers and distributed to the call center sites.

Management component 572 is arranged to activate the various engines and components, and control the flow and data transfer between them or to and from other components of the apparatus of FIG. 1, such as storage devices.

It will be appreciated by a person skilled in the art that the disclosed apparatus is exemplary only and that multiple other implementations can be designed without deviating from the disclosure. It will be further appreciated that components of the apparatus can be implemented using proprietary or commercial products.

The disclosure relates to a method and apparatus for automatically sectioning an interaction into sections, so that further insight into the interaction can be obtained. Sectioning, with or without the usage of additional or external information can help identifying time consuming parts of interactions, whether the time is well-spent or does not contribute to the organization, and should be shortened.

It will be appreciated that multiple implementations and variations of the method and apparatus can be designed. Various features and relative weights thereof can be considered and used. The method and apparatus can be implemented to assign sections to interactions, context units, words, or any other parts of an interaction.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized method for automatically sectioning an audio signal of an interaction held in a call center, into sections representing the flow of the interaction, the method comprising the steps of:
   receiving at least a part of the audio signal from a logging and capturing unit comprising a computing platform and associated with the call center, the at least a part of the audio signal comprises a non-training production run-time interaction;
   performing audio analysis on the at least a part of the audio signal for obtaining run-time data;
   segmenting the at least a part of the audio signal into at least one context unit;
   extracting a feature vector as a multi-valued construct comprising at least one run-time feature of the at least one context unit, using the run-time data;
   classifying the at least one context unit using a sectioning model and the feature vector, to obtain at least one section label to be associated with the at least one context unit; and subsequently
   grouping context units assigned identical labels into one section,
   wherein the method is carried out by an at least one processing apparatus.

2. The method of claim 1 wherein the audio analysis step comprises a voice recognition step for obtaining text from the run-time interaction, and further comprising a natural language processing step applied to the text.

3. The method of claim 2 wherein the voice recognition step comprises activating at least one engine selected from the group consisting of: a speech to text engine; a word spotting engine; an emotion detection engine; and a talkover engine.

4. The method of claim 1 further comprising an optimization step for enhancing classifying the at least one context unit.

5. The method of claim 4 wherein the optimization step is rule-based or uses a Markovian model for determining optimal transition between section candidates for the at least one context unit.

6. The method of claim 4 wherein the optimization step uses hint words for optimizing the section label or section type association with the at least one context unit.

7. The method of claim 1 wherein the feature is selected from the group consisting of: indication to a market vertical uniqueness of at least one word or word combination related to words in the at least one context unit; repetitions of at least one word or word combination related to words in the at least one context unit; indication to a market vertical uniqueness of at least one word or word combination related to words in a second context unit preceding the at least one context unit; repetitions of at least one word or word combination related to words in a second context unit preceding the at least one context unit; index position of the at least one context unit within the interaction; absolute position of the at least one context unit within the interaction; relative position of the at least one context unit within the interaction; interaction duration; duration of the at least one context unit; speaker speaking within the at least one context unit; average duration of silence between words within the at least one context unit; and part of speech of at least one word within the at least one context unit.

8. The method of claim 1 further comprising a sectioning training step for generating the sectioning model.

9. The method of claim 8 wherein the sectioning training step comprising:
   receiving a training interaction;
   performing training audio analysis on the training interaction for obtaining training data;
   segmenting the training interaction into at least one training context unit;
   extracting a training feature vector comprising at least one training feature of the at least one training context unit, using the training data;
   receiving sectioning information related to the training interaction, the sectioning information comprising a section indication for the at least one training context unit or a part thereof; and
   generating a model using the at least one training feature vector and the at least one section indication.

10. The method of claim 9 wherein the training audio analysis step comprises a voice recognition step for obtaining training text from the training interaction, and further comprising a natural language processing step applied to the training text.

11. The method of claim 9 wherein the training feature is selected from the group consisting of: indication to a market vertical uniqueness of at least one word or word combination related to words in the at least one context unit; repetitions of at least one word or word combination related to words in the at least one context unit; indication to a market vertical uniqueness of at least one word or word combination related to words in a second context unit preceding the at least one context unit; repetitions of at least one word or word combination related to words in a second context unit preceding the at least one context unit; index position of the at least one context unit within the interaction; absolute position of the at least one context unit within the interaction; relative position of the at least one context unit within the interaction; interaction duration; duration of the at least one context unit; speaker speaking within the at least one context unit; average duration of silence between words within the at least one context unit; and part of speech of at least one word within the at least one context unit.

12. The method of claim 1 further comprising a step of presenting sectioning statistics.

13. The method of claim 1 further comprising a step of comparing sectioning statistics between at least two categories or between at least two agents, or a step of using the at least one section label as a categorization criteria.

14. The method of claim 1 further comprising a step of further analysis, selected from the group consisting of: topic extraction from at least one section, link analysis of at least one section, and root cause analysis of at least one section.

15. An apparatus for automatically sectioning an interaction held in a call center, into sections representing the flow of the interaction, based on at least one training interaction, the apparatus comprising:
   an interaction receiving component arranged to receive at least a part of at least one first audio signal representing the interaction as a non-training production run-time interaction, or at least one second audio signal representing the training interaction;
   an extraction component arranged to extract data from the at least a part of the at least one first audio signal or the at least one second audio signal;
   a context unit segmentation component arranged to segment the at least a part of the at least one first audio signal or the at least one second audio signal into context units;

a feature vector determination component arranged to generate a feature vector as a multi-valued construct comprising at least one feature based on the data extracted from the at least a part of the at least one first audio signal or the at least one second audio signal; and a sectioning component arranged to apply a sectioning model on the feature vector.

16. The apparatus of claim 15 further comprising a natural language processing component arranged to perform linguistic analysis on text extracted by the extraction component.

17. The apparatus of claim 15 wherein the extraction component comprises at least one engine from the group consisting of: a speech to text engine, a word spotting engine; an emotion detection engine; and a talkover engine.

18. The apparatus of claim 15 further comprising a sectioning training component arranged to train the sectioning model.

19. The apparatus of claim 15 wherein the at least one feature is selected from the group consisting of: indication to a market vertical uniqueness of at least one word or word combination related to words in the at least one context unit; repetitions of at least one word or word combination combinations related to words in the at least one context unit; indication to a market vertical uniqueness of at least one word or word combination related to words in a second context unit preceding the at least one context unit; repetitions of at least one word or word combination related to words in a second context unit preceding the at least one context unit; index position of the at least one context unit within the interaction; absolute position of the at least one context unit within the interaction; relative position of the at least one context unit within the interaction; interaction duration; duration of the at least one context unit; speaker speaking within the at least one context unit; average duration of silence between words within the at least one context unit; and part of speech of at least one word within the at least one context unit.

20. A non-transitory computer readable storage medium containing a set of instructions for a general purpose computer, the set of instructions comprising:

receiving at least a part of an audio signal representing an interaction as a non-training production run-time interaction captured within a call center;

performing audio analysis on the at least a part of the audio signal for obtaining tested data;

segmenting the at least a part of the audio signal into at least one tested context unit;

extracting a tested feature vector as a multi-valued construct comprising at least one feature of the at least one context unit, using the data;

classifying the at least one context unit using a sectioning model and the tested feature vector, to obtain at least one section label to be associated with the at least one context unit; and subsequently grouping context units assigned identical labels into one section.

* * * * *